United States Patent [19]

Watanabe

[11] Patent Number: 5,680,153
[45] Date of Patent: Oct. 21, 1997

[54] IMAGE PROCESSING APPARATUS

[75] Inventor: Yasuhiro Watanabe, Yokohama, Japan

[73] Assignee: Canon Kabushiki Kaisha, Tokyo, Japan

[21] Appl. No.: 293,609

[22] Filed: Aug. 22, 1994

Related U.S. Application Data

[63] Continuation of Ser. No. 829,584, Feb. 3, 1992, abandoned, which is a continuation of Ser. No. 403,989, Sep. 7, 1989, abandoned, which is a continuation of Ser. No. 35,782, Apr. 8, 1987, abandoned.

[30] Foreign Application Priority Data

Apr. 16, 1986 [JP] Japan ............................ 61-88484

[51] Int. Cl.$^6$ .................................................. G09G 5/36
[52] U.S. Cl. .................................... 345/133; 345/137
[58] Field of Search ........................... 345/113, 114, 345/133, 137, 138, 190, 200, 7; 382/23, 28; 395/129, 133

[56] References Cited

U.S. PATENT DOCUMENTS

| | | | |
|---|---|---|---|
| Re. 30,679 | 7/1981 | Evans et al. | 364/523 |
| 4,189,743 | 2/1980 | Schure et al. | 340/747 |
| 4,425,559 | 1/1984 | Sherman | 340/703 |
| 4,481,594 | 11/1984 | Staggs et al. | 340/703 |
| 4,626,838 | 12/1986 | Tsujioka et al. | 340/747 |
| 4,642,625 | 2/1987 | Tsunehiro et al. | 340/703 |
| 4,646,076 | 2/1987 | Wiedenman et al. | 340/728 |
| 4,646,078 | 2/1987 | Knierim et al. | 340/747 |
| 4,656,468 | 4/1987 | Takikawa et al. | 340/747 |
| 4,709,231 | 11/1987 | Sakaibara et al. | 340/747 |
| 4,817,172 | 3/1989 | Cho | 382/21 |

FOREIGN PATENT DOCUMENTS 5341017 10/1978 Japan .

*Primary Examiner*—Chanh Nguyen
*Attorney, Agent, or Firm*—Fitzpatrick, Cella, Harper & Scinto

[57] ABSTRACT

An image processing apparatus having the function of painting out the enclosed area in the outline of an image such as a character or a figure. This apparatus includes a first memory for storing outline information indicative of the outline of the image; an editing unit to perform conversion such as enlargement, reduction, or rotation for the outline information stored in the first memory; a convertor to convert the outline information stored in the first memory to dot information; a separate memory to store the dot information; a recognition circuit to recognize singular dot information among the converted dot information in the separate memory; a painting-out circuit to paint out a closed area of the dot information except the singular dot information; and a display to display, as an image, the dot information whose closed area has been painted out by painting-out circuit. With this apparatus, the inside of the outline can be accurately painted out.

18 Claims, 8 Drawing Sheets

IMAGE PROCESSING APPARATUS

This application is a continuation of application Ser. No. 07/829,584, filed Feb. 3, 1992, now abandoned, which is a continuation of application Ser. No. 07/403,989, filed Sep. 7, 1989, now abandoned, which is a continuation of application Ser. No. 07/035,782, filed Apr. 8, 1987, now abandoned.

BACKGROUND OF THE INVENTION

1. Field of the Invention

The present invention relates to an image processing apparatus for painting out the inside of the outline of a character, a figure, or the like, thereby performing the graphic display.

2. Related Background Art

Figure 1A:
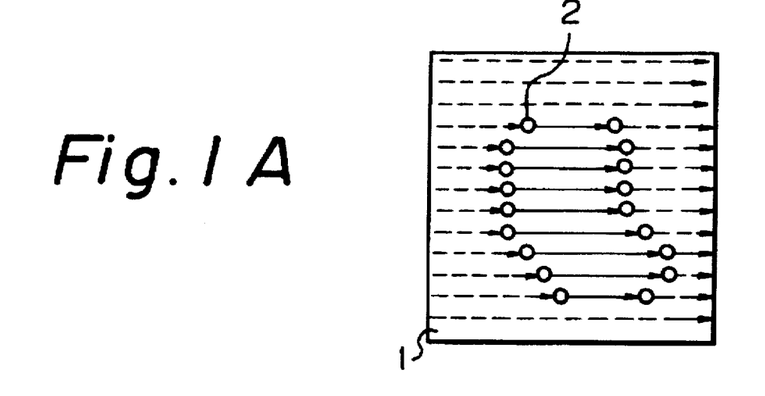
FIGS. 1A to 1C are diagrams showing examples of the process to paint out the inside of a closed area.
Figure 1B:
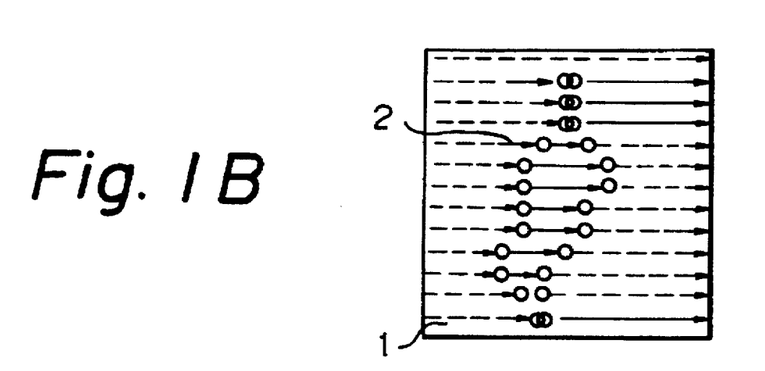
Figure 1C:
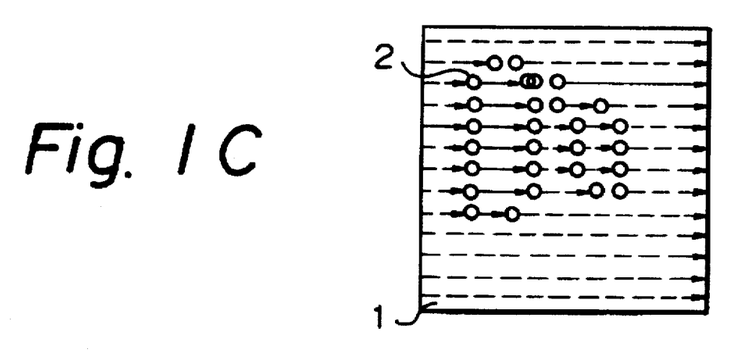

Hitherto, there have been known various kinds of methods whereby dots of an outline of a character, a figure, or the like are generated in an image memory and the closed area surrounded by these dots is painted out. For example, FIGS. 1A to 1C show examples of those methods. In the diagrams, reference numeral 1 denotes an image memory and a character, a figure, or the like is displayed by dot matrix. Numeral 2 denotes dots of the outline generated in the image memory 1. FIG. 1A shows a state in which after the dots 2 were generated in the image memory 1, the image memory 1 is sequentially scanned from the left to the right, and the area between the first dot 2 and the next dot 2 is painted out. However, according to this method, in the case of a complicated graphic, there occurs a case where a plurality of dots 2 arranged in the scanning direction are overlaid as the same point in dependence on the approximating method used when the outline is developed into a dot matrix. In such a case, as shown in FIGS. 1B and 1C, the paint-out process is executed for the outside of the outline, so that the inside of the closed area cannot be accurately painted out. Such overlay of the dots of the outline of a character, a figure, or the like typically occurs when the figure is modified or reduced, so that an accurate paint-out processing cannot be executed when the character, figure, or the like was subjected to the modifying or reducing process.

SUMMARY OF THE INVENTION

In an image processing apparatus having the function to paint out the inside of the outline of a character, a figure, or the like, it is an object of the present invention that in the case of developing the outline into digital coordinates such as a dot matrix in an image memory, at the position where the dots constituting the outline are overlaid and generated, these dots are erased, and the process to paint out the inside of the outline is executed in this state.

It is another object of the invention that the information at the position where the dots were erased due to the overlay of the dots of an outline is stored into another memory, and the erased dots are again generated on the basis of the stored information for the character, figure, or the like which was painted out, thereby accurately performing the paint-out process of the character, figure, or the like.

DETAILED DESCRIPTION OF THE PREFERRED EMBODIMENTS

An embodiment of the present invention will be described hereinbelow with reference to the drawings.

Figure 2A:
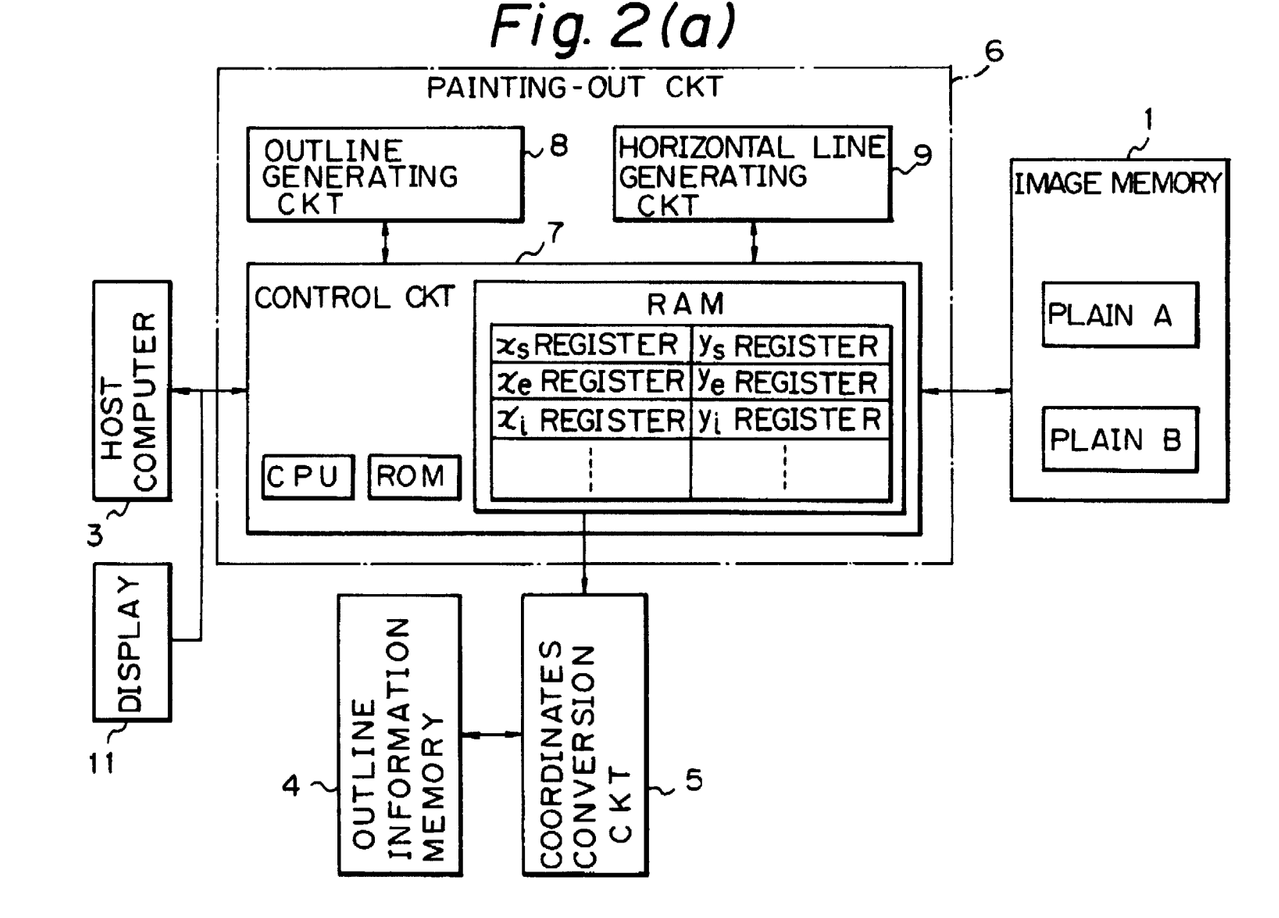
FIG. 2(a) is a block diagram of the first embodiment of an image processing apparatus of the present invention.

(a) First embodiment:

FIG. 2(a) is a block diagram of an image processing apparatus of the first embodiment of the invention. In the diagram, reference numeral 1 denotes the image memory having therein areas representing graphic plains A and B as work areas of dot matrices of the same size. Numeral 3 denotes a host computer to designate outline information in an outline information memory 4; 4 is the outline information memory in which the outline information of characters, figures, or the like is stored; and 5 is a coordinates conversion circuit to perform the affine transformation for the figure conversion in order to execute the enlargement, reduction, rotation, or the like of characters, figures, or the like. Namely, the conversion circuit 5 performs the converting process so as to satisfy the following relation between the input coordinate values $(x_i, y_i)$ and the output coordinate values $(x_0, y_0)$ after the conversion.

$$\begin{pmatrix} x_0 \\ y_0 \end{pmatrix} = \begin{pmatrix} a & b \\ c & d \end{pmatrix} \begin{pmatrix} x_i \\ y_i \end{pmatrix}$$

where, a, b, c, and d are parameters indicative of the conversion.

Figures 3, 4:
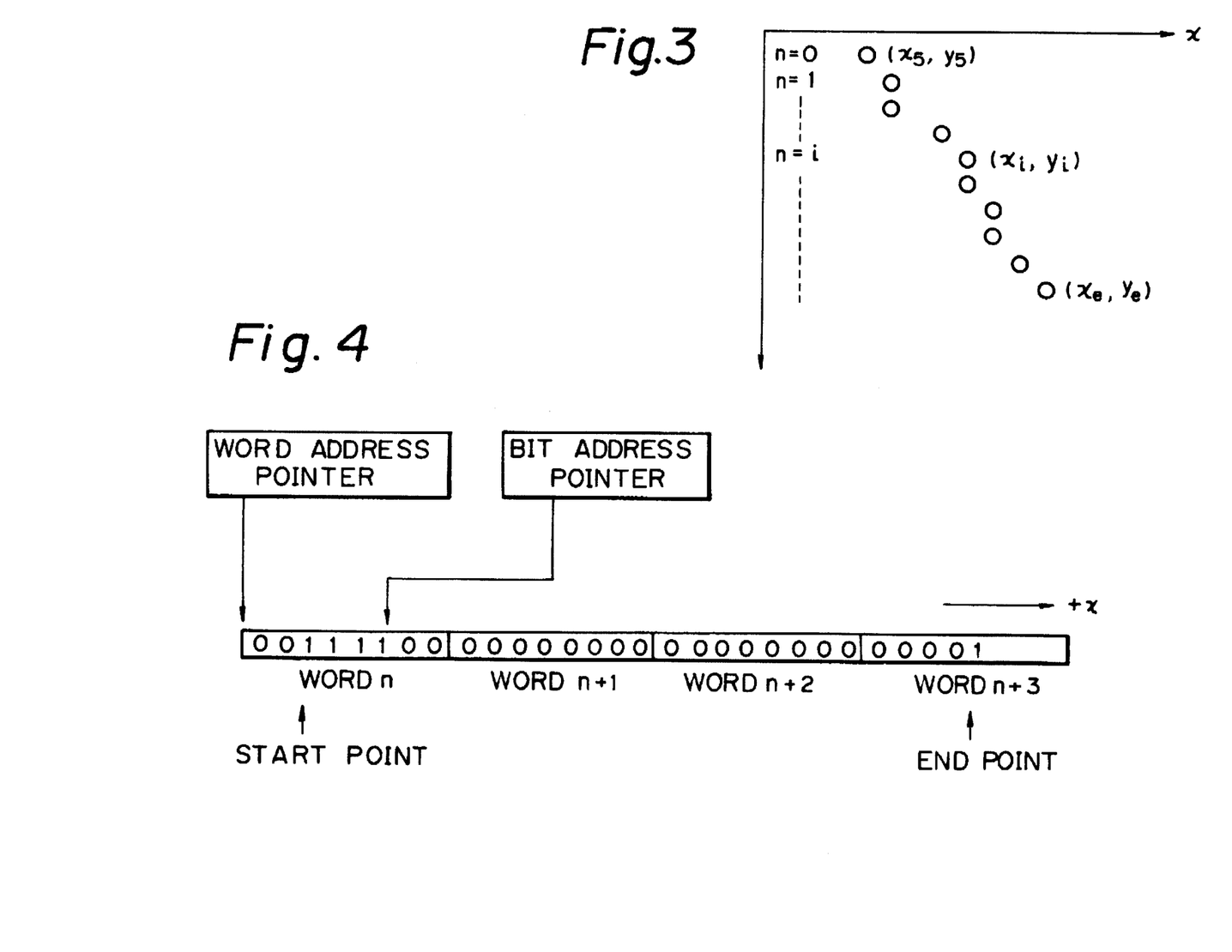
FIG. 3 is a diagram showing a state in which a digital line is generated on digital coordinates.
FIG. 4 is a diagram showing a state of generation of a horizontal line by a horizontal line generating circuit 9.

Numeral 6 represents a painting-out circuit having therein a control circuit 7, an outline generating circuit 8, and a horizontal line generating circuit 9. A display 11 displays and outputs the content of the image memory 1. The control circuit 7 has therein a CPU to execute the calculating process of the image processing apparatus, a ROM to store the programs such as a processing procedure shown in FIG. 6(a) and the like, and a RAM to store the coordinate data. The RAM includes: an $x_s$ register and a $y_s$ register to store the coordinates of the start point of a digital line which is generated from the outline generating circuit 8; an $x_e$ register and a $y_e$ register to store coordinates of the end point of the digital line; and an $x_i$ register and a $y_i$ register to store the coordinates of each dot constituting the digital line. The control circuit 7 controls the image processing apparatus in accordance with the program shown in FIG. 6(a). The outline generating circuit 8 develops the outline information of characters, figures, or the like which was read out of the outline information memory 4 into a dot matrix of the image memory 1, thereby generating a digital line as a set of dots. The horizontal line generating circuit 9 executes the process to paint out the inside of the outline of a character, a figure, or the like generated in the image memory 1 by the outline generating circuit 8 when it is assumed that the row direction of the dot matrix in the image memory 1 is set to x and the column direction is set to y. FIG. 3 is a diagram showing a state of generation of a digital line. The outline generating circuit 8 approximates the continuous dots from the coordinates of the sample points of the outline information of the characters, figures, or the like which were read out of the memory 4, thereby developing into a dot matrix. Practically speaking, when the coordinates $(x_s, y_s)$ of an arbitrary start point and the coordinates $(x_e, y_e)$ of an arbitrary end point on an outline are given, it is assumed that $$x_0 = x_s$$

$$x_{n+1} = x_n + \Delta x$$

$$\text{where, } \Delta x = \frac{x_e - x_s}{|y_e - y_s|}$$

Figure 5A:
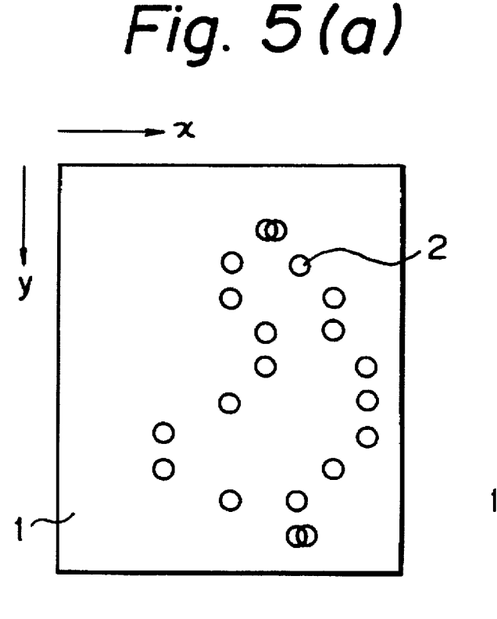
FIGS. 5(a) to 5(d) are diagrams showing a state of the paint-out process in the first embodiment of the invention.
Figure 5B:
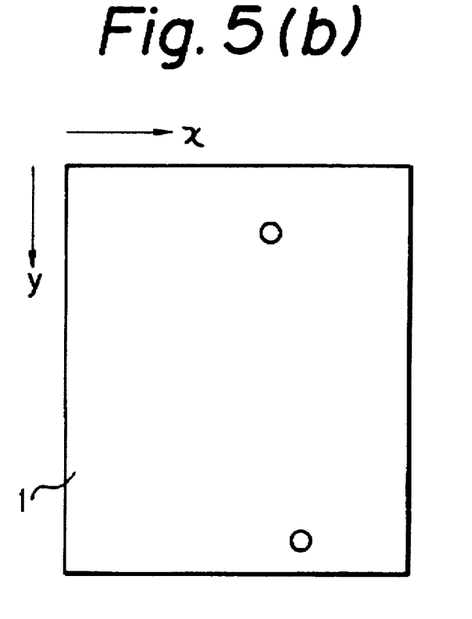
Figure 5C:
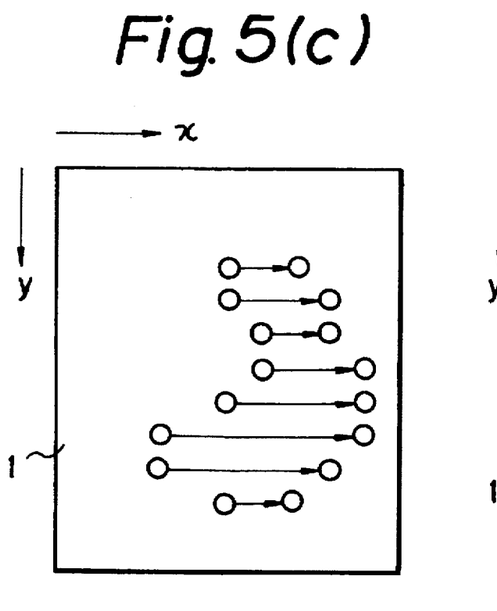
Figure 5D:
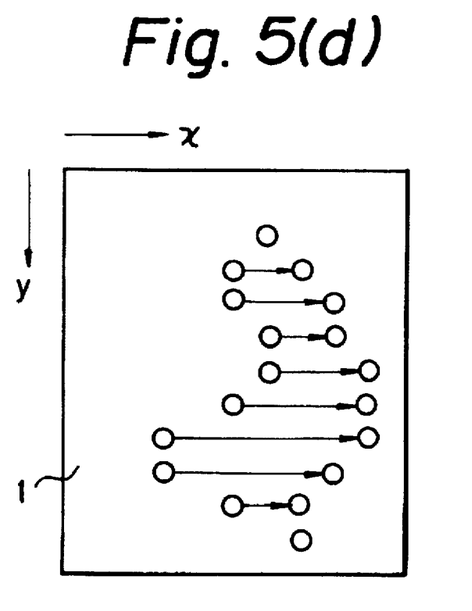
Figure 6A:
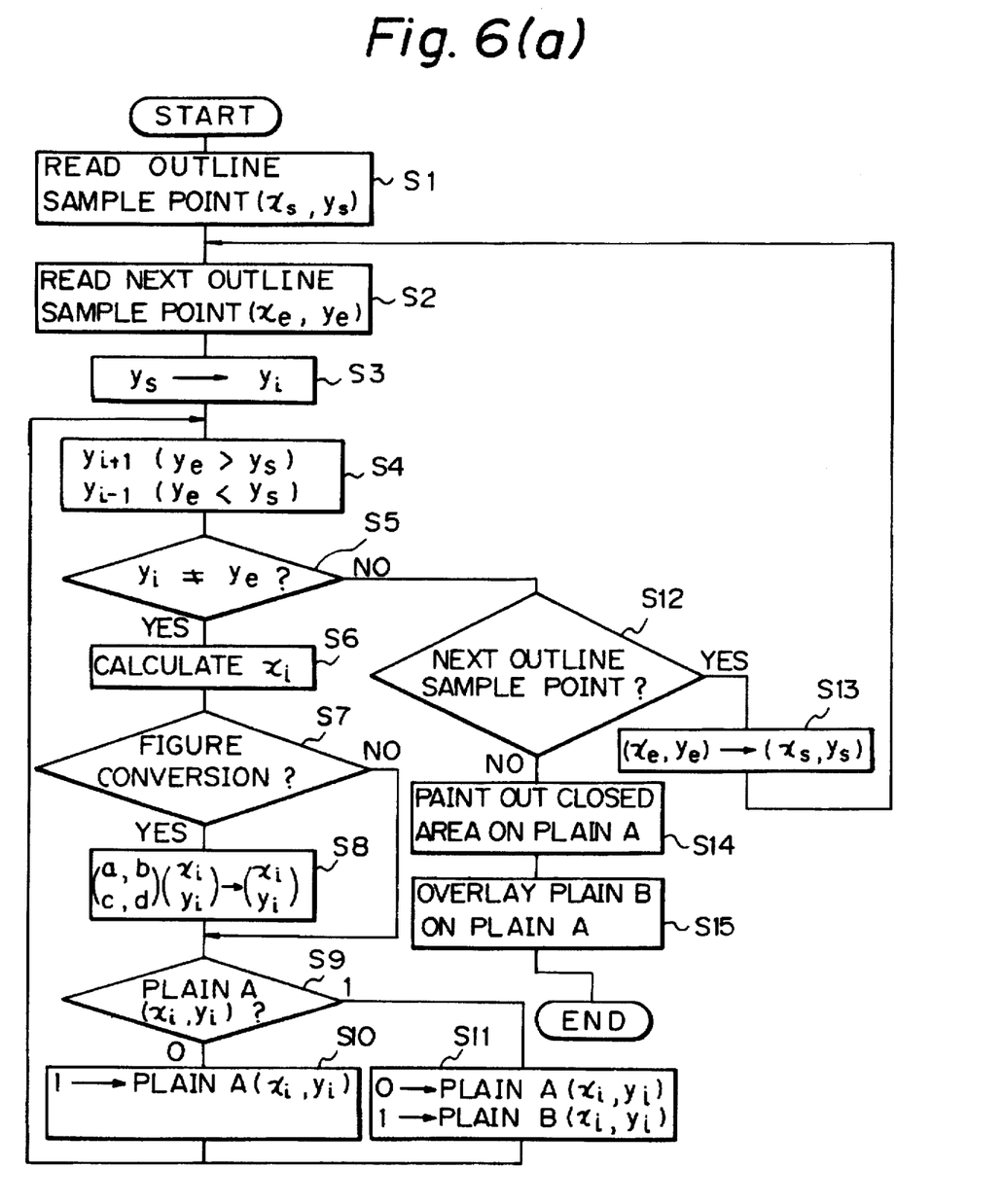
FIG. 6(a) is a flowchart showing a control procedure of the paint-out process in the first embodiment of the invention.

$x_n$ is sequentially calculated by changing $y_n$ from $y_s$ to $y_e$ one by one, thereby generating a digital line as shown in FIG. 3. FIG. 4 is a diagram showing an internal state of the horizontal line generating circuit. The horizontal line generating circuit 9 draws a line, namely, generates dots from the coordinate point stored in the image memory 1 to the dot which has already been generated in the direction of +x. Practically speaking, the coordinate point is set to the word address pointer and the bit address pointer in the horizontal line generating circuit 9. Since the +x direction is the continuous direction of addresses, when the scanning in the word is finished by sequentially increasing the bit address pointer, the bit address pointer is cleared and the word address pointer is increased. These operations are repeated. While the scanning is performed in the x direction, the content of the bits shown by both pointers is read out. If it is 0, 1 is written. When 1 is read out, the processes are finished. When the word address is increased, the word is once read out. If the content of the word is 0, it is sufficient to set 1 into all of the bits. Therefore, the area corresponding to the word width can be painted out at once. FIG. 4 shows a state in which a horizontal line is generated from the start point and 1 is set to the fourth bit. Thereafter, the word n+1 and word n+2 are painted out on a word unit basis. For the word n+3, a line is drawn on a bit unit basis until the end point. FIGS. 5(a) to 5(d) are diagrams showing a state of the paint-out process of a figure in the image memory 1 in the first embodiment. FIG. 6(a) is a flowchart showing a procedure for the figure process in the first embodiment. The program according to this procedure is stored in the ROM in the control circuit 7.

The first embodiment of the invention will now be explained with reference to FIG. 6(a).

First, the host computer 3 designates the outline information in the memory 4. The painting-out circuit 6 holds the plains A and B as the word areas of the image generating dot matrixes in the image memory 1. In steps 1 and 2, two sample points of the outline information are read out of the outline information memory 4 and input to the outline generating stored into the registers $x_s$, $y_s$, $x_e$, and $y_e$ in thecircuit. The values of the coordinate points are control circuit 7. Since the content of each register corresponds to the coordinate point of the image memory 1, a dot is generated at the coordinate point corresponding to the content of each register. Although the dot information is shown in FIGS. 5(a) to 5(f) for convenience of explanation, the bit information may be also stored as an actual memory content. Therefore, there is no time limit for the period of time after the information was stored into each register until the character, figure, or the like is actually displayed and output in the image memory 1.

In the next step 3, the content of the $y_s$ register is also stored into the $y_i$ register. In step 4, the values of the $y_e$ and $y_s$ registers are compared. When the value of the $y_e$ register is larger than the value of the $y_s$ register, 1 is added to the value of the $y_i$ register. When the value of the $y_s$ register is larger, 1 is subtracted from the value of the $y_i$ register. In the next step 5, a check is made to see if the value of the $y_i$ register is incoincident with the value of the $y_e$ register or not. If they do not coincide, i.e., if YES in step 5, step 6 follows. If they coincide, i.e., if NO in step 5, step 12 follows. In step 6, the value of the x coordinate is calculated in the outline generating circuit 8 and stored into the $x_i$ register. In the next step 7, a check is made to see if the figure converting process for the enlargement, reduction, rotation, or the like is executed or not. If YES, step 8 follows. If NO, step 9 follows. In step 8, the affine transformation for the figure conversion is executed in the coordinates conversion circuit 5. The resultant value of the coordinate point is rewritten into the $x_i$ and $y_i$ registers. In step 9, a check is then made to see if a dot has already been generated on the coordinate point of the plain A corresponding to the values of the $x_i$ and $y_i$ registers or not. If NO, step 10 follows. If YES, step 11 follows. In step 10, a dot is generated on the coordinate point of the plain A corresponding to the values of the $x_i$ and $y_i$ registers and thereafter, the processing routine is returned to step 4. In step 11, the dot on the coordinate point of the plain A corresponding to the values of the $x_i$ and $y_i$ registers is erased and a dot is generated on the same coordinate point of the plain B. Then, the processing routine is returned to step 4. FIGS. 5(a) and 5(b) show a state of the image memory 1 when those processes were executed. FIG. 5(a) shows a state in which a digital line was generated in the plain A. In FIG. 5(a), a plurality of dots are generated in a manner such that they are shown overlaid in the shifted state. However, this state is illustrated for convenience of explanation only. In the actual state, these dots are generated in the completely overlaid state and such a shifted state does not occur. FIG. 5(b) shows the dots generated in the plain B.

If NO in step 5, step 12 follows and a check is made to see if the next sample point for generation of an outline exists or not. If YES, namely, if the sample point to generate the next outline, i.e., to generate what is called a digital line exists, step 13 follows. If NO, namely, if the generation of the outline was finished, step 14 follows. In step 13, the contents of the $x_e$ and $y_e$ registers are stored into the $x_s$ and $y_s$ registers and the processing routine is returned to step 2. In step 14, the closed area between the dots generated on the plain A is painted out by the horizontal line generating circuit 9. This state is shown in FIG. 5(c). In the next step 15, by synthesizing the content of the plain B to the content of the plain A in the state after completion of the paint-out process, the generation of the outline and the paint-out process of the inside of the outline are finished. Even if the content of the plain B is not synthesized to the content of the plain A, namely, even if the plain B is not used, the final image line can be sufficiently used although it may lack completeness. In this manner, the paint-out process of a character, a figure, or the like is executed. The content of the image memory 1 at this time is displayed and output by a display 11. In this case, the display 11 may either display the content stored in the image memory 1 one by one or display the content after completion of the paint-out process.

Figure 2B:
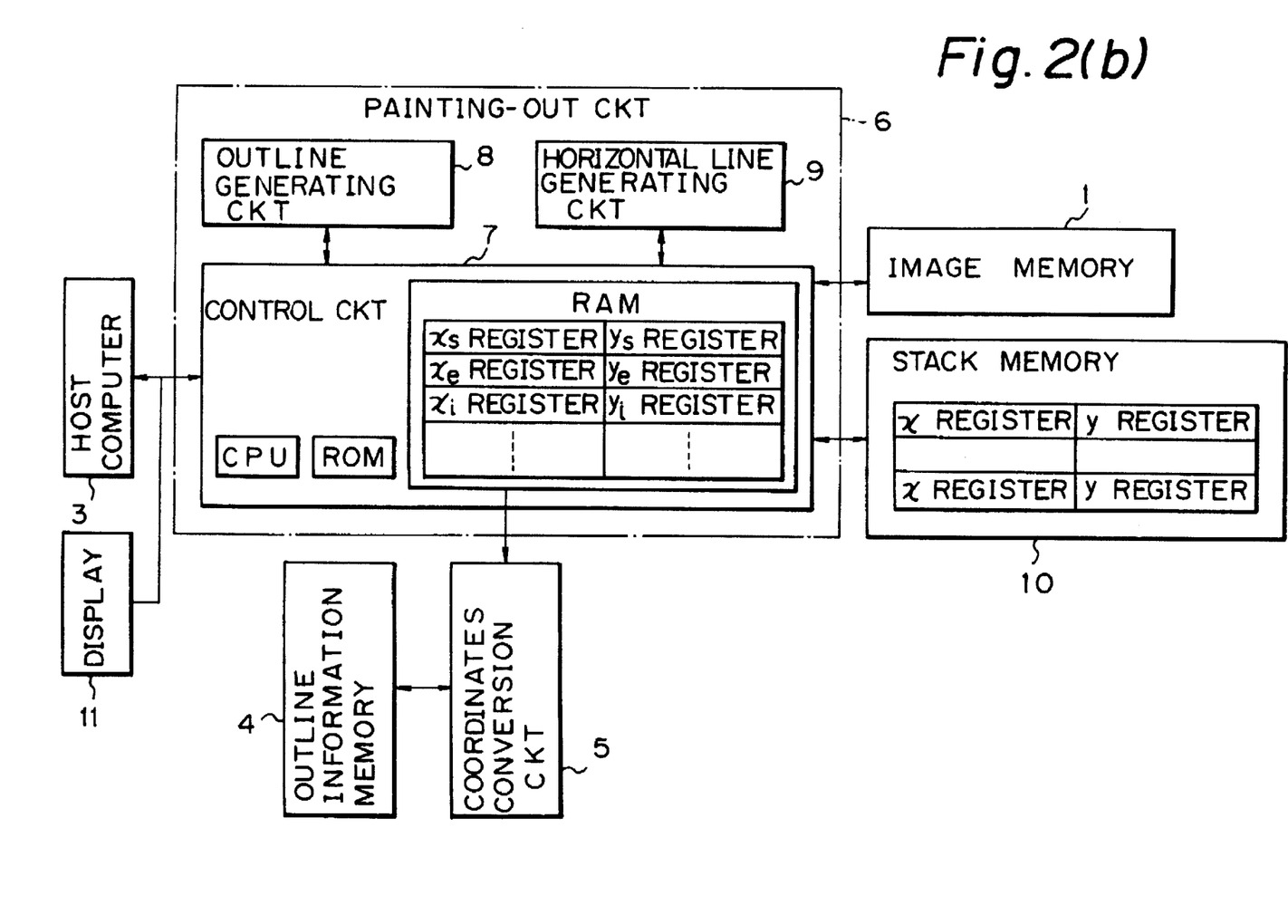
FIG. 2(b) is a block diagram of the second embodiment of an image processing apparatus of the invention.

(b) Second embodiment:

The second embodiment of the invention will now be explained. FIG. 2(b) is a block diagram of an image processing apparatus of the second embodiment. In the diagram, reference numeral 1 denotes the image memory to develop a character, a figure, or the like into a dot matrix and display; 3 the host computer; 4 the outline information memory; 5 the coordinates conversion circuit; 6 the painting-out circuit; 7 the control circuit; 8 the outline generating circuit; 9 the horizontal line generating circuit; and 11 the display. Since the host computer 3, memory 4, and the like operate in a manner similar to those described in the foregoing first embodiment, their descriptions are omitted. Numeral 10 denotes a stack memory. When the dots of a character, a figure, or the like are generated by a digital line in the image memory 1, if the dot as a part of another digital line has already been generated at the coordinate point to which the dot ought to be generated, the coordinate data at that point is stored in the stack memory 10. The stack memory 10 has x and y registers for this purpose.

Figure 5E:
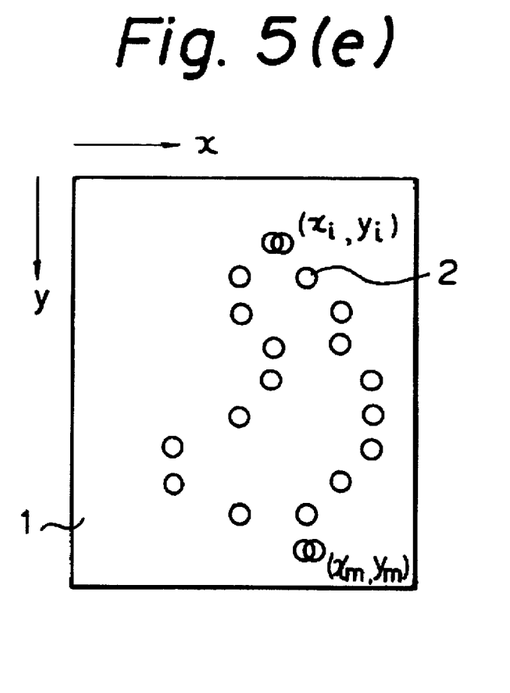
FIGS. 5(e) to 5(h) are diagrams showing a state of the paint-out process in the second embodiment of the invention.
Figure 5F:
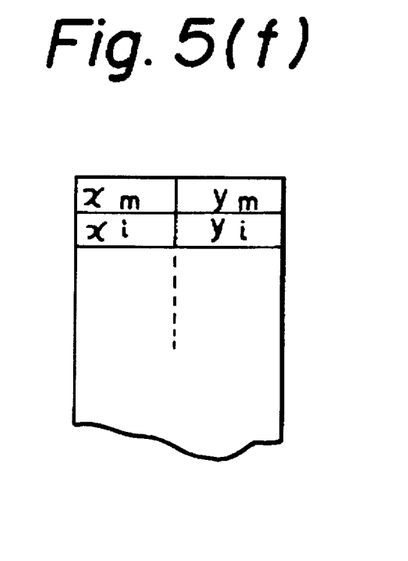
Figure 5G:
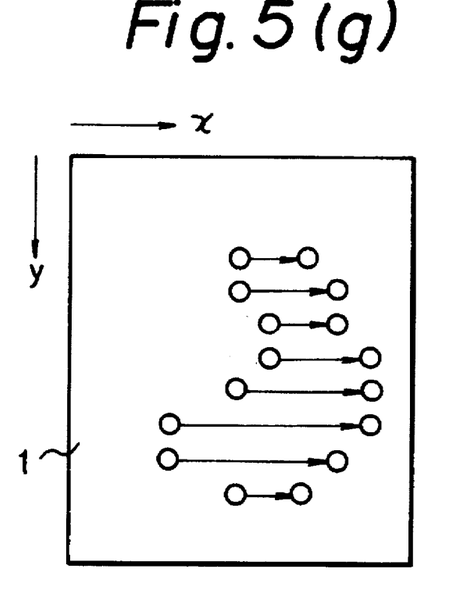
Figure 6B:
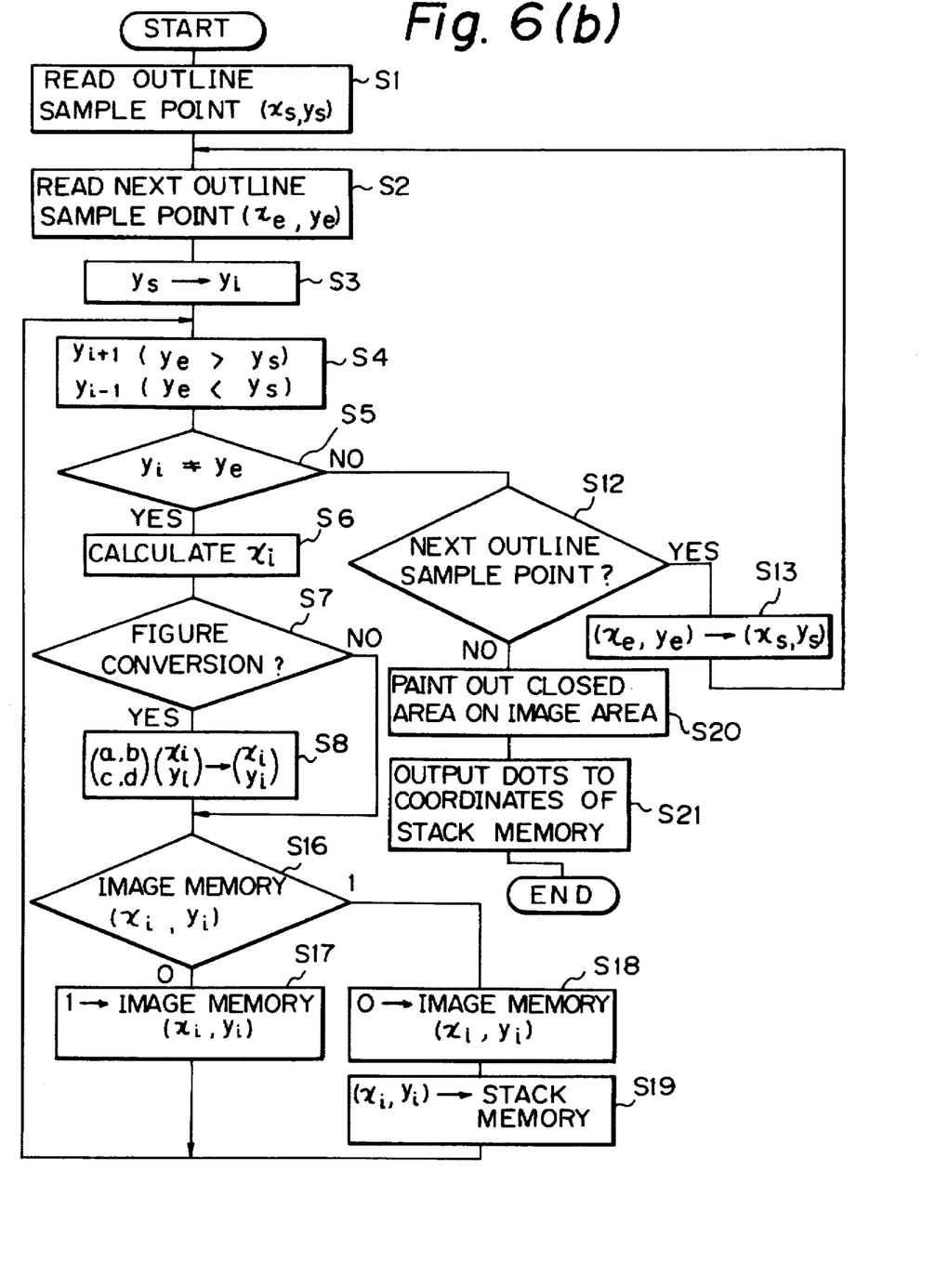
FIG. 6(b) is a flowchart showing a control procedure of the paint-out process in the second embodiment of the invention.

FIGS. 5(e) and 5(f) are diagrams showing a state of the paint-out process in this embodiment. FIG. 6(b) is a flowchart showing a procedure for the paint-out process in the second embodiment of the invention. The program according to this procedure is stored in the ROM in the control circuit 7. An explanation will now be made hereinbelow with reference to the flowchart of FIG. 6(b). The processes in steps 1 to 8 are similar to those in steps 1 to 8 in FIG. 6(a); therefore, they will be simply explained here. In step 1, a dot is generated to the coordinate point as a start point of a digital line which is generated in the image memory 1 in the outline information of the outline information memory 4. The coordinate values are stored into the $x_s$ and $y_s$ registers. In the next step 2, the coordinate point and a dot as an end point of the preceding digital line are generated. The coordinate values are stored into the $x_e$ and $y_e$ registers. In step 3, the value of the $y_s$ register is transferred to the $y_i$ register. In step 4, the value of the $y_i$ register is increased by 1 so as to approach the value of the $y_e$ register. In step 5, the values of the $y_i$ and $y_e$ registers are compared. If they coincide, step 12 follows. If they do not coincide, step 6 follows. In step 6, the x coordinate corresponding to the value of the $y_i$ register is calculated by the outline generating circuit 8 and step 7 follows. In step 7, a check is made to see of the figure conversion is executed or not. If YES, step 8 follows and the affine transformation is executed and the processing routine advances to step 16. If NO, step 16 directly follows. In step 8, the respective coordinate values after completion of the affine transformation are stored into the $x_i$ and $y_i$ register. In step 16, a check is made to see if the dot has already been generated at the coordinate point to which a dot ought to be generated on the dot matrix of the image memory 1 or not. If the dot has already been generated, step 18 follows. If NO, step 17 follows. In step 17, a dot is generated to the coordinate point on the dot matrix of the image memory 1 corresponding to the values stored in the $x_i$ and $y_i$ registers. The processing routine is returned to step 4. In step 18, the coordinate point in the image memory 1 which was used for the discrimination in step 16 is erased. This state will be explained with reference to FIG. 5(e). In the diagram, the dots are overlaid at the coordinates $(x_l, y_l)$ and $(x_m, y_m)$. Therefore, the dots at the coordinates $(x_l, y_l)$ and $(x_m, y_m)$ are erased and the dots are generated in the image memory 1 in such a state as shown in FIG. 5(g). In the next step 19, the coordinate values at the coordinate points erased in step 18 are respectively stored into the x and y registers in the stack memory 10. This state is shown in FIG. 5(f). This diagram illustrates the example in which the values of the coordinates $(x_l, y_l)$ and $(x_m, y_m)$ as the coordinate points to which the dots are overlaid and generated in FIG. 5(e) were stored.

Figure 5H:
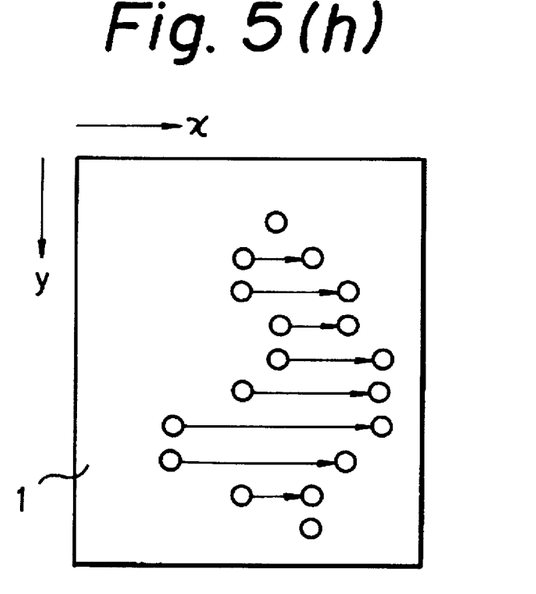

After completion of this process, the processing routine is returned to step 4. An explanation will now be made with respect to the case where the processing routine advances to step 12 as the result of the discrimination of step 5, namely, the case where one digital line was generated. In step 12, a check is made to see if the next sample point for generation of an outline exists or not. If the sample point for generation of the next outline, namely, for generation of a digital line exists, step 13 follows. If the sample point does not exist, namely, if the generation of the outline was finished, step follows. In step 13, the coordinate of the start point of the next digital line is obtained. Practically speaking, the values stored in the $x_e$ and $y_e$ registers as the coordinate of the end point of the digital line which were generated just before the execution of the foregoing process are transferred into the $x_s$ and $y_s$ registers. Then, the processing routine is returned to step 2. The process in the case where the processing routine advances to step 20 will be explained. The closed area between the dots generated in the image memory 1 is painted out by the horizontal line generating circuit 9. This state is shown in FIG. 5(g). After completion of this process, step 21 follows. A dot is output to the coordinate point in the image memory 1 corresponding to the coordinate point stored in the stack memory 10 and added to the image after completion of the paint-out process in the image memory 1. This state is illustrated in FIG. 5(h). Similarly to the first embodiment, the figure in the state in which the dots on the coordinate point at which a plurality of dots are overlaid were erased can be also used without using the stack memory 10. A character, a figure, or the like is painted out in this manner. The content of the image memory 1 is displayed and output by the display 11 similarly to the first embodiment.

In the second embodiment, the process to paint out the closed area between the dots generated in the image memory 1 has been executed by generating a horizontal line by the horizontal line generating circuit 9. However, such a paint-out process can be also executed by use of a vertical line by providing a vertical line generating circuit.

With the foregoing constitution and operation, in the image processing apparatus in which the outline of a character, a figure, or the like is developed and output onto a dot matrix of the image memory 1 by approximating the continuous dots on the basis of the information of the special sample coordinate points, if some of the output dots were overlaid at the same coordinate point on the dot matrix, no dot is generated onto this coordinate point, thereby allowing the inside and outside of the outline to be easily distinguished. Thus, the inside of the outline can be accurately painted out.

With the image processing apparatus of the invention, when a character, a figure, or the like is developed onto the coordinate point of a dot matrix of the image memory, it is prevented that some of the dots constituting the outline of the character, figure, or the like are overlaid and generated on the same coordinate point. Thus, the inside and outside of the outline can be easily distinguished. Accordingly, when the inside of the outline of a character, a figure, or the like is painted out, only the inside of the outline can be accurately painted out. The invention can be also applied to the case where the dots are overlaid as the result of the figure conversion such as enlargement, reduction, rotation, or the like of a character, a figure, or the like. Therefore, the process to paint-out the character, figure, or the like after completion of the figure conversion can be accurately executed.

What is claimed is:

1. An image processing apparatus comprising:

first memory means for storing coordinate data for representing a figure;

second memory means for storing pixel data for forming an outline of a figure;

third memory means for storing coordinate data for specifying a location;

conversion means for reading the coordinate data stored in said first memory means and coordinate converting the read coordinate data;

determining means for determining whether any piece of the pixel data has already been stored in said second memory means at a particular location corresponding to the coordinate data coordinate-converted by said conversion means;

control means for, responsive to a determination by said determining means that no piece of the pixel data has already been stored at the particular location, controlling said second memory means to store a piece of the pixel data at the particular location, and for, responsive to a determination by said determining means that a piece of the pixel data has already been stored at the particular location, controlling said second memory means to erase the stored piece of the pixel data and controlling said third memory means to store coordinate data for specifying the particular location;

painting means for painting an inside of a region defined by the pixel data stored in said second memory means, to produce painted pixel data; and generation means for adding the pixel data corresponding to the coordinate data stored in said third memory means to the painted pixel data produced by said painting means, to generate pixel data to be output.

2. An apparatus according to claim 1, further comprising output means for outputting the figure generated by said generation means.

3. An apparatus according to claim 2, wherein said output means outputs either the painted pixel data obtained by said painting means or the figure generated by said generation means, as needed.

4. An apparatus according to claim 2, wherein said output means has a first mode in which the pixel data under painting operation is successively displayed and a second mode in which the pixel data as a completed painting operation is displayed.

5. An apparatus according to claim 2, 3 or 4, wherein said output means comprises a display device.

6. An apparatus according to claim 1, further comprising a host computer which designates the coordinate data representing the figure processed in said apparatus.

7. An image processing method using a first memory which stores coordinate data for representing a figure, a second memory which stores pixel data for forming an outline of a figure and a third memory which stores coordinate data for specifying a location, said method comprising the steps of:

reading the coordinate data stored in the first memory and coordinate converting the read coordinate data;

determining whether any piece of the pixel data has already been stored in the second memory at a particular location corresponding to the coordinate-converted coordinate data;

responsive to a determination in said determining step that no piece of the pixel data has already been stored at the particular location, controlling the second memory to store a piece of the pixel data at the particular location and, responsive to a determination in said determining step that a piece of the pixel data has already been stored at the particular location, controlling the second memory to erase the stored piece of the pixel data and controlling the third memory to store coordinate data for specifying the particular location;

painting an inside of a region defined by the pixel data stored in the second memory, to produce painted pixel data; and adding the pixel data corresponding to the coordinate data stored in the third memory to the produced painted pixel data, to generate pixel data to be output.

8. A method according to claim 7, further comprising an output step for outputting the figure generated in said generating step.

9. A method according to claim 8, wherein said output step includes outputting either the painted pixel data obtained in said painting step or the figure generated in said generation step, as needed.

10. A method according to claim 8, wherein said output step has a first mode in which the pixel data under painting operation is successively displayed and a second mode in which the pixel data as completed by the painting operation is displayed.

11. A method according to claim 8, 9 or 10, wherein said output step comprises outputting using a display device.

12. A method according to claim 7, further comprising a designating step in which the coordinate data representing the figure processed is designated.

13. A tangible recording medium storing therein instructions which when loaded into a programmable apparatus will cause the apparatus to perform an image processing method using a first memory which stores coordinate data for representing a figure, a second memory which stores pixel data for forming an outline of a figure and a third memory which stores coordinate data for specifying a location, said method comprising the steps of:

reading the coordinate data stored in the first memory and coordinate converting the read coordinate data;

determining whether any piece of the pixel data has already been stored in the second memory at a particular location corresponding to the coordinate-converted coordinate data;

responsive to a determination in said determining step that no piece of the pixel data has already been stored at the particular location, controlling the second memory to store a piece of the pixel data at the particular location and, responsive to a determination in said determining step that a piece of the pixel data has already been stored at the particular location, controlling the second memory to erase the stored piece of the pixel data and controlling the third memory to store coordinate data for specifying the particular location;

painting an inside of a region defined by the pixel data stored in the second memory, to produce painted pixel data; and adding the pixel data corresponding to the coordinate data stored in the third memory to the produced painted pixel data, to generate pixel data to be output.

14. A recording medium according to claim 13, wherein said method further comprises an output step for outputting the figure generated in said generating step.

15. A recording medium according to claim 14, wherein said output step includes outputting either the painted pixel data obtained in said painting step or the figure generated in said generation step, as needed.

16. A recording medium according to claim 14, wherein said output step has a first mode in which the pixel data under painting operation is successively displayed and a second mode in which the pixel data as completed by the painting operation is displayed.

17. A recording medium according to claim 14, 15 or 16, wherein said output step comprises outputting using a display device.

18. A recording medium according to claim 13, wherein said method further comprises a designating step in which the coordinate data representing the figure processed is designated.

* * * * *

UNITED STATES PATENT AND TRADEMARK OFFICE
CERTIFICATE OF CORRECTION

PATENT NO. : 5,680,153

DATED : October 21, 1997

INVENTOR(S): YASUHIRO WATANABE

Page 1 of 2

It is certified that error appears in the above-identified patent and that said Letters Patent is hereby corrected as shown below:

ON THE TITLE PAGE AT [56] REFERENCES CITED, FOREIGN PATENT DOCUMENTS

"5341017" should read --53-41017--.

ON THE TITLE PAGE AT [57], ABSTRACT

Line 7, "convertor" should read --converter--.

COLUMN 1

Line 40, "was" should read --has been--;
Line 54, "into another" should read --in a separate--.

COLUMN 2

Line 20, "An embodiment" should read --Embodiments--;
Line 38, "conversion." should read --conversion:--.

COLUMN 3

Line 59, "stored into the registers $x_s$, $y_s$, $x_e$ and $y_e$ in" should be deleted;
Line 60, "thecircuit." should read --circuit.-- and "are control" should read --are stored into the registers $x_s$, $y_s$, $x_e$, and $y_e$ in the control.

UNITED STATES PATENT AND TRADEMARK OFFICE
CERTIFICATE OF CORRECTION

PATENT NO. : 5,680,153

DATED : October 21, 1997

INVENTOR(S): YASUHIRO WATANABE                    Page 2 of 2

It is certified that error appears in the above-identified patent and that said Letters Patent is hereby corrected as shown below:

COLUMN 5

Line 41, "of" should read --if--.

COLUMN 6

Line 10, "step" should read --step 20--.

Signed and Sealed this

Fifth Day of May, 1998

Attest:

BRUCE LEHMAN

Attesting Officer          Commissioner of Patents and Trademarks